United States Patent
Rousseau et al.

(10) Patent No.: US 6,385,379 B1
(45) Date of Patent: May 7, 2002

(54) BROADBAND STEPPED INDEX OPTICAL FIBER

(75) Inventors: Jean-Claude Rousseau, Chatou; Michel Hertz, Paris; Marianne Paillot, Asnieres; Raphaelle Sauvageon, Thones; Jean-Francois Chariot, Marly le Roi, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/505,771

(22) Filed: Feb. 17, 2000

(30) Foreign Application Priority Data

Feb. 18, 1999 (FR) .............................. 99 02027

(51) Int. Cl.$^7$ ................................. G02B 6/16
(52) U.S. Cl. ..................................... 385/123
(58) Field of Search ................... 385/123–147

(56) References Cited

U.S. PATENT DOCUMENTS

| | | | |
|---|---|---|---|
| 4,402,570 A | * 9/1983 | Chang | .................... 385/123 |
| 4,525,027 A | 6/1985 | Okamoto et al. | |
| 4,691,991 A | * 9/1987 | Unger | .................... 385/123 |
| 4,715,679 A | * 12/1987 | Bhagavatula | .................... 385/123 |
| 4,768,853 A | * 9/1988 | Bhagavatula | .................... 385/123 |
| 4,889,404 A | * 12/1989 | Bhagavatula | .................... 385/123 |
| 5,261,016 A | * 11/1993 | Poole | .................... 385/28 |

* cited by examiner

Primary Examiner—Akm E. Ullah
(74) Attorney, Agent, or Firm—Sughrue Mion, PLLC

(57) ABSTRACT

A stepped index optical fiber is disclosed having a chromatic dispersion cancellation wavelength less than 1 280 nm or even 1 250 nm. The fiber can be used for wavelength-division multiplex transmission not only in the window around 1 550 nm but also in the window around 1 300 nm. The chromatic dispersion in the second window enables transmission without excessively penalizing non-linear effects. A fiberoptic transmission system which uses the above fiber as line fiber is also disclosed.

7 Claims, 1 Drawing Sheet

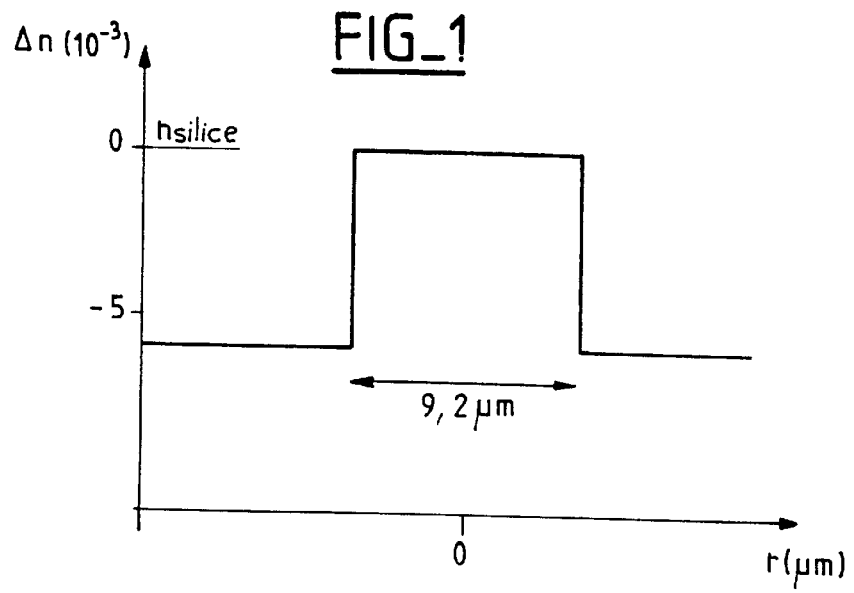
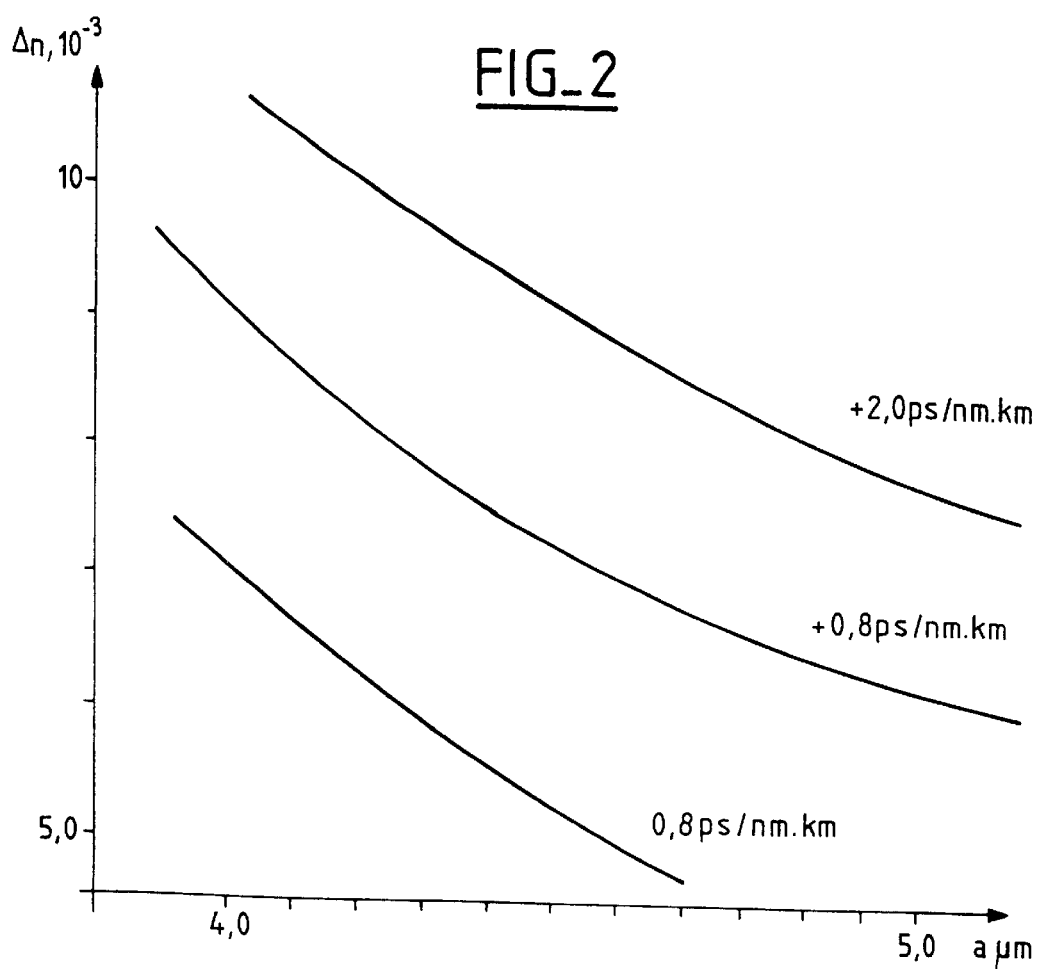

BROADBAND STEPPED INDEX OPTICAL FIBER

BACKGROUND OF THE INVENTION

1. Field of the Invention

The present invention relates to the field of fiberoptic transmission and in particular to wavelength-division multiplex fiberoptic transmission systems.

2. Description of the Prior Art

The index profile of optical fibers is generally qualified as a function of the shape of the graph of the function relating the refractive index to the radius of the fiber. It is conventional to plot on the abscissa axis the distance r to the center of the fiber and on the ordinate axis the difference between the refractive index at the radius r and the refractive index of the cladding of the fiber. The terms "step", "trapezium" and "triangle" index profiles are therefore used for graphs which are respectively step-shaped, trapezium-shaped and triangular. The curves are generally representative of the theoretical or setpoint profile of the fiber and fiber fabrication constraints can lead to a significantly different profile.

In new high bit rate wavelength-division multiplexed transmission networks it is advantageous to control chromatic dispersion, especially for bit rates of 10 Gbit/s and above; the objective is to obtain substantially zero cumulative chromatic compensation over the link for all wavelength values of the multiplex, in order to limit broadening of the pulses. A cumulative dispersion value of a few hundred ps/nm is acceptable. It is also beneficial to avoid zero values of chromatic dispersion in the vicinity of the wavelengths used in the system, for which the non-linear effects are greater. Finally, it is also beneficial to limit the chromatic dispersion slope over the range of the multiplex to prevent or limit distortion between the channels of the multiplex.

Stepped index fibers are conventionally used as line fibers in fiberoptic transmission systems. ASMF 200 stepped index monomode fiber has a chromatic dispersion cancellation wavelength $\lambda_0$ from 1 300 nm to 1 320 nm and an absolute chromatic dispersion less than 3.5 ps/(nm.km) in a range from 1 285 nm to 1 330 nm and equal to 18 ps/(nm.km) at 1 550 nm. The chromatic dispersion slope at 1 550 nm is in the order of 0.05 ps/(nm².km).

A stepped index fiber having a core whose index is $5 \times 10^{-3}$ greater than the index of the cladding typically has a chromatic dispersion cancellation wavelength $\lambda_0$ around 1 310 nm. It can be obtained by doping the silica with germanium, which increases the chromatic dispersion cancellation wavelength $\lambda_0$. There is zero chromatic dispersion in the silica for a wavelength $\lambda_0$ of 1 285 nm; doping with germanium increases this value to 1 310 nm.

It is well known in the art that non-linear effects decrease as the effective area of the fiber increases. The article by M. Kato et al., "A new design for dispersion shifted fiber with an effective core area larger than 100 µm² and good bending characteristics", ThK2, OFC'98 Technical Digest, explains that non-linear effects in the fibers could become the dominant capacity and transmission distance limitations for high-capacity long-haul amplified transmission systems. The document indicates that one solution is to increase the effective area of the fibers, which enables a higher power and a greater distance between repeaters to be obtained. The document proposes a fiber having a coaxial profile, surrounded by a pedestal, with an effective area of 146 µm² and a chromatic dispersion cancellation wavelength $\lambda_0$ equal to 1 500 nm. The chromatic dispersion at 1 550 nm is low and the dispersion slope at this wavelength is equal to 0.09 ps/(nm².km).

The article by D. Bayart and S. Gauchard, "50 GHz channel spacing analysis in N×2.5 Gbit/s systems", OFC'98 Technical Digest WD2, describes a wavelength-division multiplex transmission system with 32 to 80 channels or more having a unit bit rate of 2.5 Gbit/s. The channels lie within a range of wavelengths from 1 530 nm to 1 560 nm with a spacing of 50 GHz, i.e. 0.4 nm between adjacent channels.

In wavelength-division multiplex transmission systems known in the art, the signals are transmitted within this range of wavelengths but not within the range of wavelengths around 1 300 nm, referred to as the second window.

The invention proposes to use not only the transmission window around 1 550 nm but also the transmission window around 1 300 nm in a wavelength-division multiplex transmission system. To limit non-linear effects, the invention proposes a stepped index fiber whose chromatic dispersion is not less than 2 ps/(nm.km) for wavelengths above 1 280 nm; compared to a stepped index fiber known in the art, this can be achieved by reducing the chromatic dispersion cancellation wavelength $\lambda_0$.

SUMMARY OF THE INVENTION

To be more precise, the invention proposes a stepped index optical fiber having a chromatic dispersion cancellation wavelength not greater than 1 280 nm.

In one embodiment of the invention, the fiber has a chromatic dispersion cancellation wavelength not greater than 1 250 nm.

The fiber preferably has a chromatic dispersion not less than 2 ps/(nm.km) for a wavelength not less than 1 280 nm.

The fiber advantageously has a core whose index is substantially constant and a cladding whose index is less than the index of the core.

In one embodiment of the invention the fiber has a core whose index is less than the index of silica.

In one embodiment of the invention the fiber has a core and a cladding doped with fluorine or boron.

The core of the fiber preferably has a radius of not less than 4.5 µm.

The invention also relates to a wavelength-division multiplex transmission system using fiber of the above kind as line fiber.

Other features and advantages of the invention will become apparent on reading the following description of embodiments of the invention which is given by way of example only and with reference to the accompanying drawings.

BRIEF DESCRIPTION OF THE DRAWINGS

FIG. 1 shows the index profile of a first embodiment of a fiber in accordance with the invention.

FIG. 2 shows iso-dispersion curves as a function of the radius and the value of the index step.

DETAILED DESCRIPTION OF THE PREFERRED EMBODIMENT

The invention proposes a stepped index fiber in which the chromatic dispersion cancellation wavelength is less than 1 280 nm and preferably less than 1 250 nm. It also proposes a stepped index fiber in which the chromatic dispersion is not less than 2 ps/(nm.km) for wavelengths greater than 1 280 nm; as the chromatic dispersion is an increasing function of the wavelength for a stepped index fiber, this assures that the chromatic dispersion is greater than 2 ps/(nm.km) throughout the transmission band of the multiplex. This value limits non-linear effects between adjacent channels in a wavelength-division multiplex transmission system using the fiber of the invention as line fiber.

The invention therefore enables the use of the stepped index fiber to transmit wavelength-division multiplex signals not only at wavelengths around 1 550 nm but also at wavelengths around 1 300 nm or more generally in the window from 1 280 nm to 1 630 nm.

The remainder of the description with reference to the drawings gives examples of fiber profiles for obtaining the above values. FIG. 1 is a diagrammatic representation of the index profile of a first embodiment of a fiber in accordance with the invention; in the embodiment shown in FIG. 1 the indices of the fiber known in the art are modified to reduce the value of the chromatic dispersion cancellation wavelength. The fiber shown in FIG. 1 has a stepped index profile, i.e. a core with a substantially constant index greater than that of the cladding around it. In the example shown in the figure, the difference between the index of the core and the index of the cladding is $6 \times 10^{-3}$ and the radius of the core of the fiber is 4.6 μm.

The figure also shows the index of silica. FIG. 1 shows that the index of the cladding is less than the index of silica. The difference between the index of silica and the index of the cladding can be $6 \times 10^{-3}$.

The fiber shown in the figure can be obtained by doping the core of the fiber and the cladding with fluorine, which has the property of reducing the index and the chromatic dispersion cancellation wavelength $\lambda_0$. The fiber shown in the figure is obtained with 1% by weight of fluorine in the core of the fiber. The cladding is doped even more strongly to constitute a guide structure; the concentration of fluorine in the cladding is 2% by weight. These proportions of dopant can be obtained with fiber fabrication technologies such as the plasma technology, the outside vapor phase deposition (OVD) technology or the vapor phase axial deposition (VAD) technology. Boron could also be used to dope the core of the fiber; concentrations of 13% by weight in the core and 2% by weight of fluorine in the cladding achieve similar characteristics.

The fiber shown in FIG. 1 has a chromatic dispersion cancellation wavelength $\lambda_0$ of 1 270 nm. Its other characteristics are as follows:

chromatic dispersion at 1 300 nm: 2.4 ps/(nm.km);

chromatic dispersion slope at 1 300 nm; 0.08 ps/(nm$^2$.km);

chromatic dispersion at 1 550 nm: 19.5 ps/(nm.km);

chromatic dispersion slope at 1 550 nm: 0.05 ps/(nm$^2$.km).

The other characteristics of the fiber—cut-off wavelength, attenuation, sensitivity to curvatures and microcurvatures—are similar to the corresponding characteristics of the stepped index fiber known in the art.

The fiber of the invention therefore enables wavelength-division multiplex transmission in the range of wavelengths from 1 300 nm to 1 700 nm.

FIG. 2 shows iso-dispersion curves as a function of the radius and the index difference between the fiber core and the cladding of a stepped index fiber, in other words the loci of the points with the same dispersion in the plane whose axes are the radius of the core, on the one hand, and the index difference between the core and the cladding, on the other hand. The radius of the core in micrometers is plotted on the abscissa axis. The difference between the refractive index of the core and the refractive index of the cladding, graduated in multiples of $10^{-3}$, is plotted on the ordinate axis. The curves show the value of the dispersion at 1 280 nm for a stepped index profile fiber having the radius shown on the abscissa axis and the index step value shown on the ordinate axis and a buried cladding having an index difference relative to the index of silica of $-10 \times 10^{-3}$.

The figure shows that the chromatic dispersion increases as the core radius increases and as the index difference between the cladding and the core increases. Accordingly, the radius of the core of the fiber can also be increased to reduce the chromatic dispersion cancellation wavelength. This can be effected in combination with or independently of reducing the index as described with reference to FIG. 1.

The fiber of the invention can be used as line fiber for a transmission system, in particular for a wavelength-division multiplex transmission system. The chromatic dispersion at wavelengths from 1 300 nm to 1 700 nm limits non-linear effects and in particular four-wave mixing between adjacent channels. For example, the fiber of the invention could be used to transmit 400 to 500 channels with a spacing of 50 GHz between adjacent channels in a range of wavelengths from 1 300 nm to 1 600 nm.

Of course, the present invention is not limited to the examples and embodiments shown and described and is open to many variants that will be evident to the skilled person. Clearly the profile shown in FIG. 1 is given by way of example only and other profiles can yield fibers having the characteristics of the invention. In particular, it is possible to use boron and fluorine at the same time to obtain a fiber profile of the kind shown in FIG. 1; a reduction of the index and an increase of the core radius can be combined in this way, in particular to reduce the concentrations of dopant in the fiber relative to the FIG. 1 example. This has the advantage of enabling the fiber to be fabricated using the modified chemical vapor phase deposition (MCVD) technology.

There is claimed:

1. A stepped index optical line fiber comprising:

a core having a substantially constant index; and a cladding having an index less than the index of said core;

wherein said fiber has a chromatic dispersion cancellation wavelength not greater than 1 280 nm, and chromatic dispersion not less than 2 ps/(nm.km) for a wavelength not less than 1 280 nm.

2. The fiber claimed in claim 1 having a chromatic dispersion cancellation wavelength not greater than 1 250 nm.

3. The fiber claimed in claim 1 having a core of substantially constant index and a cladding having an index less than the index of said core.

4. The fiber claimed in claim 3 having a core whose index is less than the index of silica.

5. The fiber claimed in claim 3 having a core and a cladding doped with fluorine or boron.

6. The fiber claimed in claim 3 wherein said core has a radius not less than 4.5 μm.

7. A wavelength-division multiplex transmission system including fiber as claimed in claim 1 as line fiber.

* * * * *